United States Patent
Asano et al.

(10) Patent No.: US 9,234,738 B2
(45) Date of Patent: Jan. 12, 2016

(54) ROTATION-ANGLE DETECTION DEVICE

(75) Inventors: Takumi Asano, Tokyo (JP); Takeshi Musha, Tokyo (JP); Hiroshi Nishizawa, Tokyo (JP); Takashi Okamuro, Tokyo (JP); Noriyasu Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 298 days.

(21) Appl. No.: 13/879,731

(22) PCT Filed: Nov. 18, 2010

(86) PCT No.: PCT/JP2010/070585
§ 371 (c)(1),
(2), (4) Date: Apr. 16, 2013

(87) PCT Pub. No.: WO2012/066667
PCT Pub. Date: May 24, 2012

(65) Prior Publication Data
US 2013/0200885 A1    Aug. 8, 2013

(51) Int. Cl.
 G01B 7/30    (2006.01)
 G01D 5/14    (2006.01)
 G01D 5/245   (2006.01)

(52) U.S. Cl.
 CPC  *G01B 7/30* (2013.01); *G01D 5/145* (2013.01); *G01D 5/2451* (2013.01)

(58) Field of Classification Search
 CPC ......... G01B 7/30; G01D 5/145; G01D 5/2451
 See application file for complete search history.

(56) References Cited

U.S. PATENT DOCUMENTS 4,159,537 A * 6/1979 Schwartz ..................... 365/8
4,860,432 A * 8/1989 Kawata ..................... 29/602.1

(Continued)

FOREIGN PATENT DOCUMENTS

CN  201503273 U  6/2010
JP  60-60790 A   4/1985

(Continued)

OTHER PUBLICATIONS

Communication dated Dec. 2, 2014, issued by the State Intellectual Property Office of the People's Republic of China in corresponding Chinese Application No. 201080070197.6.

(Continued)

*Primary Examiner* — Huy Q Phan
*Assistant Examiner* — Adam Clarke
(74) *Attorney, Agent, or Firm* — Sughrue Mion, PLLC; Richard C. Turner

(57) ABSTRACT

A detection track includes a first detection element group that includes a plurality of first magnetic resistance elements arranged at a pitch $\lambda/(2n)$ when an order to cancel target harmonic components among a plurality of harmonic components superimposed on a fundamental component of a detection signal for multi-pole magnetic pattern is assumed as n, and a second detection element group that includes a plurality of second magnetic resistance elements arranged at the pitch $\lambda/(2n)$, a plurality of first dummy magnetic resistance elements arranged among the first magnetic resistance elements, and a plurality of second dummy magnetic resistance elements arranged among the second magnetic resistance elements. Pitches between adjacent magnetic resistance elements among the first magnetic resistance elements and the first dummy magnetic resistance element are equivalent to one another, and pitches between adjacent magnetic resistance elements among the second magnetic resistance elements and the second dummy magnetic resistance element are equivalent to one another.

4 Claims, 9 Drawing Sheets

(56) References Cited

U.S. PATENT DOCUMENTS

| | | | |
|---|---|---|---|
| 7,592,803 B1* | 9/2009 | Guo et al. | 324/207.25 |
| 2008/0309331 A1* | 12/2008 | Qian et al. | 324/252 |
| 2009/0102464 A1* | 4/2009 | Doogue et al. | 324/207.21 |

FOREIGN PATENT DOCUMENTS

| | | |
|---|---|---|
| JP | 01-269014 A | 10/1989 |
| JP | 3-32451 U | 3/1991 |
| JP | 6-18279 A | 1/1994 |
| JP | 2529960 B2 | 6/1996 |
| JP | 8-304108 A | 11/1996 |
| JP | 2000-314603 A | 11/2000 |
| JP | 2006-126087 A | 5/2006 |

OTHER PUBLICATIONS

Communication dated Nov. 4, 2014, issued by the Japanese Patent Office in counterpart Japanese application No. 2012-544059.

Taiwanese Office Action, issued Feb. 21, 2014, Application No. 100116436.

Japanese Office Action (Notice of Rejection) mailed Mar. 4, 2014, Application No. 2012-544059.

\* cited by examiner

ROTATION-ANGLE DETECTION DEVICE

CROSS REFERENCE TO RELATED APPLICATIONS

This application is a National Stage of International Application No. PCT/JP2010/070585, filed on Nov. 18, 2010, the contents of all of which are incorporated herein by reference in their entirety.

FIELD

The present invention relates to a rotation-angle detection device.

BACKGROUND

An ordinary magnetic rotation-angle detector detects a rotation angle of a rotary drum as a rotation angle of a body of revolution such as a motor coupled to the rotary drum via a shaft by using a result of detection by a magnetic sensor with respect to a magnetic field generated by a multi-pole magnetic pattern on the rotary drum having N and S poles which are provided on an outer circumference and on which magnetization alternately occurs at a magnetization pitch $\lambda$. Magnetic resistance elements (MR elements) such as AMR elements are used for the magnetic sensor, and the magnetic sensor uses properties of the AMR elements that electric resistance changes in proportion to the change in a magnetic field. The magnetic sensor causes the MR elements to detect the changes in the magnetic field due to the rotation of the rotary drum, and detects the rotation angle of the rotary drum based on a sine-wave detection signal obtained by this detection of the change.

More specifically, the magnetic sensor is configured to output a sine-wave detection signal (a phase-A detection signal) and a cosine-wave detection signal (a phase-B detection signal) in phases shifted by 90 degrees from each other by arranging the MR elements in an array. A computing device that receives these detection signals from the magnetic sensor and that is located in rear of the magnetic sensor performs an arc tangent arithmetic operation between the phase-A detection signal and the phase-B detection signal, thereby computing the rotation angle of the rotary drum.

Generally, when a magnetic flux density waveform is converted into a detection signal (an MR waveform) of the MR elements, harmonic distortions are always superimposed on the MR waveform for the following reasons. An MR characteristic curve used to convert a magnetic flux density into the detection signal (a resistance change rate) of the MR elements is of a shape of a quadratic function having a minimum at the position of a magnetic flux density of zero. Furthermore, as for higher magnetic fields (magnetic flux densities) than an inflection point (deviating from the quadratic function shape), outputs from the MR elements saturate. Therefore, the MR waveform becomes closer to a rectangular waveform.

Patent Literature 1 describes a configuration in which a plurality of MR elements are arranged so that the MR elements other than one MR element are away from the one MR element by $\lambda/10$, $\lambda/6$, and $\lambda/6+\lambda/10$, respectively in a magnetic sensor for detecting the position of a rotary drum on which magnetic signals are recorded at pitches $\lambda$. This configuration has the following effects. According to Patent Literature 1, a differential amplifier located in rear of these four MR elements adds up output signals from the MR elements. Therefore, it is supposed that it becomes possible to cancel fifth and third harmonic waves and to cancel waveform distortions of an output signal from the magnetic sensor generated by the saturation of the MR elements.

CITATION LIST

Patent Literature

Patent Literature 1: Japanese Patent No. 2529960

SUMMARY

Technical Problem

As described above, the magnetic sensor described in Patent Literature 1 needs to arrange the MR elements according to a rule (hereinafter, "waveform-distortion cancellation rule") for arranging paired MR elements arrayed (at the pitch $\lambda/10$) in a positional relation for cancelling a fifth distortion, further in a positional relation (at the pitch $\lambda/6$) for cancelling a third distortion with a view of cancelling both the third and fifth distortions. That is, in the magnetic sensor described in Patent Literature 1, it is necessary to arrange the MR elements in four portions away from one MR element by 0, $\lambda/10$, $\lambda/6$, and $\lambda/6+\lambda/10$, respectively so as to effectively cancel the third and fifth distortions.

Meanwhile, each MR element is formed by a ferromagnetic thin film and it is known that the MR element itself collects the magnetic field from the rotary drum. Therefore, when the MR elements are arranged according to the waveform-distortion cancellation rule, the MR elements are inevitably arranged at non-equidistant pitches. That is, in the magnetic sensor described in Patent Literature 1, irregularities in MR magnetism collection effects generate spatial distortions of magnetic flux densities. As a result, in the magnetic sensor described in Patent Literature 1, imbalance tends to occur between the signals from the paired MR elements arrayed in the positional relation for the cancellation of the fifth distortion, and imbalance tends to occur between the signals from the paired MR elements arrayed in the positional relation for the cancellation of the third distortion. This possibly degrades the efficiency for cancelling waveform distortions of the output signal from the magnetic sensor (a rotation-angle detection device).

The present invention has been achieved to solve the above problems, and an object of the present invention is to provide a rotation-angle detection device that can improve the efficiency for cancelling waveform distortions of a detection signal from the rotation-angle detection device.

Solution to Problem

There is provided a rotation-angle detection device for detecting a rotation angle of a rotary drum having a multi-pole magnetic pattern at a magnetization pitch $\lambda$ on an outer circumference, the rotation-angle detection device comprising a detection track that detects the multi-pole magnetic pattern, wherein the detection track includes a first detection element group that includes a plurality of first magnetic resistance elements, and that is arranged between a first reference potential and an output terminal, the first magnetic resistance elements being arranged at a pitch $\lambda/(2n)$, when an order to cancel target harmonic components among a plurality of harmonic components superimposed on a fundamental component of a detection signal for the multi-pole magnetic pattern is assumed as n, a second detection element group that includes a plurality of second magnetic resistance elements arranged at the pitch $\lambda/(2n)$, and that is arranged between the output terminal and a second reference potential, a plurality of first dummy magnetic resistance elements arranged among the first magnetic resistance elements, and a plurality of second dummy magnetic resistance elements arranged among the second magnetic resistance elements, and wherein pitches between adjacent magnetic resistance elements among the first magnetic resistance elements and the first dummy magnetic resistance element are equivalent to one another, and pitches between adjacent magnetic resistance elements among the second magnetic resistance elements and the second dummy magnetic resistance element are equivalent to one another.

Advantageous Effects of Invention

According to the present invention, it is possible to make equivalent magnetism collection effects of first magnetic resistance elements and first dummy magnetic resistance elements, and to make uniform the spatial distribution of magnetic flux densities near the first magnetic resistance elements. It is also possible to make equivalent magnetism collection effects of second magnetic resistance elements and second dummy magnetic resistance elements, and to make uniform the spatial distribution of magnetic flux densities near the first magnetic resistance elements. This makes it possible to improve the efficiency for cancelling waveform distortions of a detection signal from the rotation-angle detection device.

DESCRIPTION OF EMBODIMENTS

Exemplary embodiments of a rotation-angle detection device according to the present invention will be explained below in detail with reference to the accompanying drawings. The present invention is not limited to the embodiments.

First Embodiment

Figure 1:
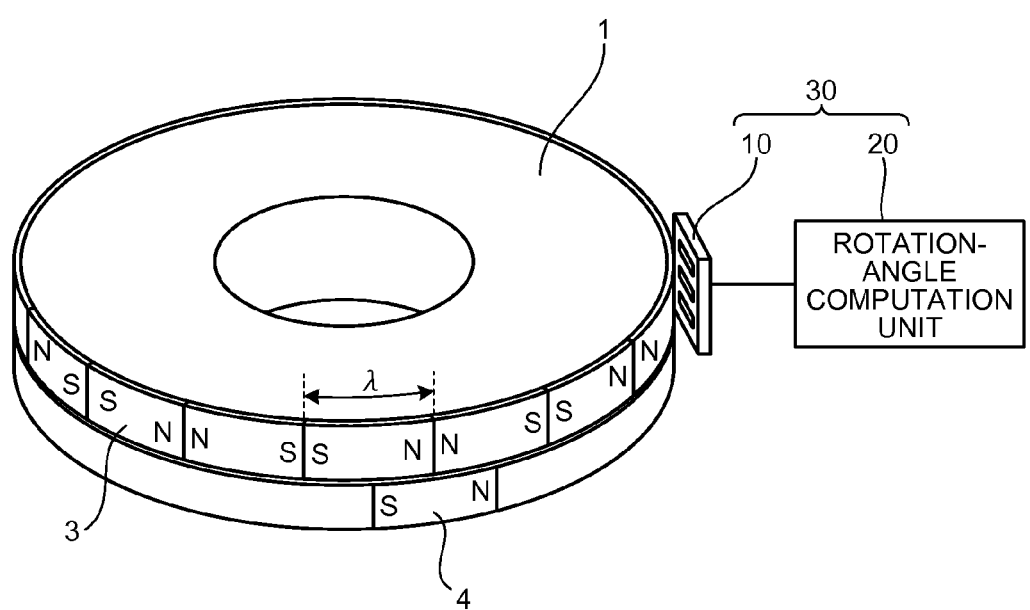
FIG. 1 depicts a configuration of a rotation-angle detection device according to a first embodiment.
Figure 2:
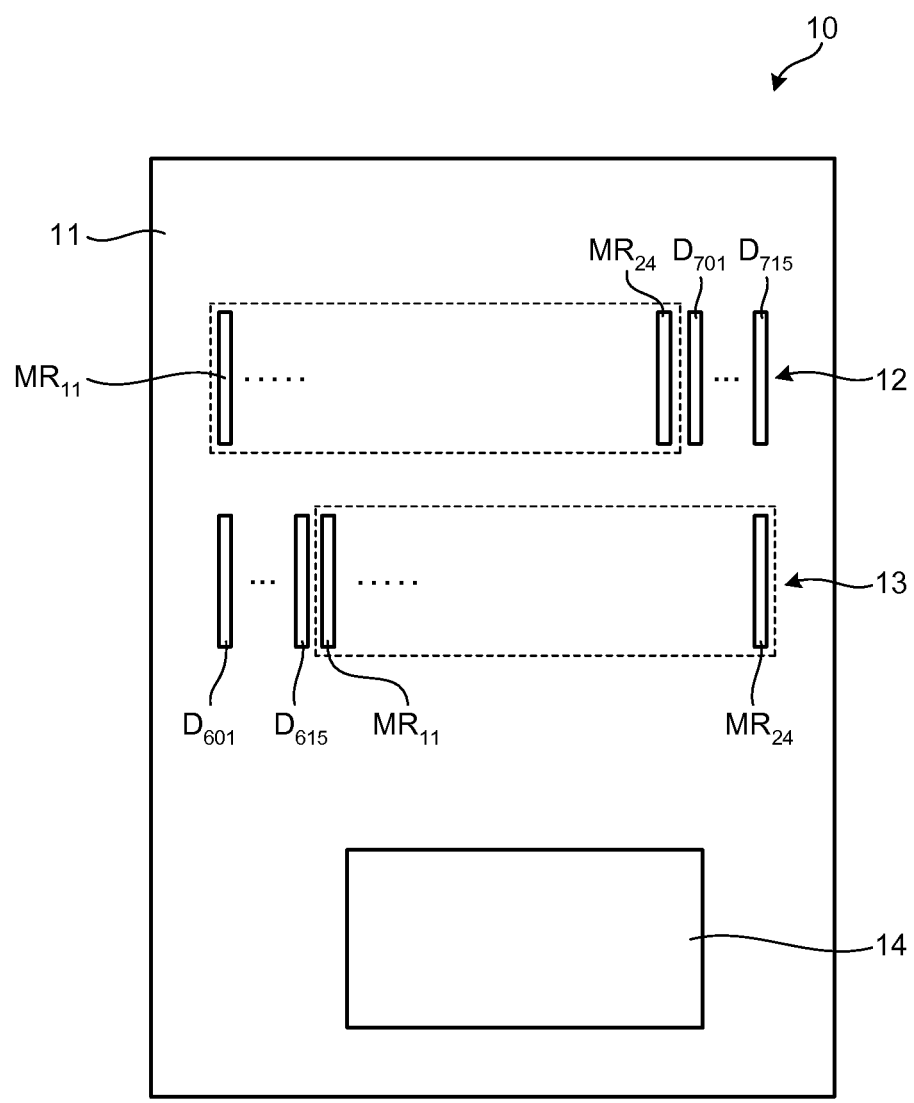
FIG. 2 depicts a configuration of a magnetic sensor according to the first embodiment.

A rotation-angle detection device 30 according to a first embodiment is explained with reference to FIGS. 1 and 2. FIG. 1 depicts a schematic configuration of the rotation-angle detection device 30 according to the first embodiment. FIG. 2 depicts a configuration of a magnetic sensor 10 according to the first embodiment.

As shown in FIG. 1, the rotation-angle detection device 30 detects a rotation angle of a rotary drum 1. The rotary drum 1 includes a multi-pole magnetic pattern 3 and a magnetic pattern 4 on an outer circumference. The multi-pole magnetic pattern 3 has N and S poles on which magnetization occurs alternately and repeatedly. The magnetic pattern 4 has one portion magnetized so as to indicate an origin in a circumferential direction of the rotary drum 1.

The rotation-angle detection device 30 includes the magnetic sensor 10 and a rotation-angle computation unit 20. The magnetic sensor 10 is arranged to face the outer circumference of the rotary drum 1. The magnetic sensor 10 detects a change in a magnetic field received from the magnetic drum 1 when the magnetic drum 1 rotates and outputs a detection result to the rotation-angle computation unit 20. The rotation-angle computation unit 20 computes a rotation angle of the rotary drum 1 based on the detection result of the magnetic sensor 10.

Specifically, as shown in FIG. 2, the magnetic sensor 10 includes a substrate 11, a phase-A detection track 12, a phase-B detection track (second detection track) 13, and a phase-Z detection track 14.

The substrate 11 is arranged at such a position on the magnetic sensor 10 as to face the outer circumference of the rotary drum 1, and forms a facing surface that faces the outer circumference of the rotary drum 1. The substrate 11 is rectangular, for example. For example, the substrate 11 is formed by a material mainly containing glass.

The phase-A detection track 12 is arranged at such a position as to face the multi-pole magnetic pattern 3 on the substrate 11 (on the facing surface that faces the outer circumference of the rotary drum 1). The phase-A detection track 12 detects the multi-pole magnetic pattern 3.

That is, the phase-A detection track 12 includes a plurality of magnetic resistance elements MR11 to MR24. The phase-A detection track 12 converts the change in the magnetic field received from the multi-pole magnetic pattern 3 when the rotary drum 1 rotates into changes in resistances of the magnetic resistance elements M11 to M24, and detects the change. The phase-A detection track 12 outputs a detection result (a voltage in proportion to the changes in the resistances of the magnetic resistance elements M11 to M24) to the rotation-angle computation unit 20 as a phase-A (a sine wave) detection signal ($\sin \theta$).

The phase-B detection track 13 is provided at a position that deviates perpendicularly from the phase-A detection track 12 in the circumferential direction of the rotary drum 1 and at which the phase-B detection track 13 faces the multi-pole magnetic pattern 3 on the substrate 11 (on the facing surface that faces the outer circumference of the rotary drum 1). The phase-B detection track 13 detects the multi-pole magnetic pattern 3 in a phase different by $\lambda/4$ from a phase of the phase-A detection track 12.

That is, the phase-B detection track 13 includes a plurality of magnetic resistance elements MR11 to MR24, converts the change in the magnetic field received from the multi-pole magnetic pattern 3 (in the phase different by $\lambda/4$ from the phase of the phase-A detection track 12) when the rotary drum 1 rotates into changes in resistances of the magnetic resistance elements MR11 to MR24, and detects the change. The phase-B detection track 13 outputs a detection result (a voltage in proportion to the changes in the resistances of the magnetic resistance elements MR11 to MR24) to the rotation-angle computation unit 20 as a phase-B (a cosine wave) detection signal ($\cos \theta$).

The phase-Z detection track 14 is arranged at a position that deviates perpendicularly from the phase-A detection track 12 and the phase-B detection track 13 in the circumferential direction of the rotary drum 1 and at which the phase-Z detection track 14 faces the magnetic pattern 4 on the substrate 11 (on the facing surface that faces the outer circumference of the rotary drum 1). The phase-Z detection track 14 detects the magnetic pattern 4. That is, the phase-Z detection track 14 detects a change in the magnetic field received from the magnetic pattern 4 when the rotary drum 1 rotates, and outputs a detection result to the rotation-angle computation unit 20 as a phase-Z (origin position) detection signal.

The rotation-angle computation unit 20 computes a rotation angle θ of the rotary drum 1 with a position indicated by the phase-Z detection signal set as an origin as expressed by the following Equation (1).

$$\theta = \tan^{-1}((\sin\theta)/(\cos\theta)) \quad \text{Equation 1}$$

The phase-A detection track 12 and the phase-B detection track 13 are equivalent in width and position in the circumferential direction of the rotary drum 1. Specifically, each of the phase-A detection track 12 and the phase-B detection track 13 includes a common pattern indicated by a dashed line, and deviates from each other in a position of the common pattern by λ/4 in the circumferential direction of the rotary drum 1. Dummy magnetic resistance elements D701 to D715 are arranged at the right of the common pattern of the phase-A detection track 12. Dummy magnetic resistance elements D601 to D615 are provided at the left of the common pattern of the phase-B detection track 13. The phase-A detection track 12 and the phase-B detection track 13 are thereby equivalent in width and position in the circumferential direction of the rotary drum 1.

Figure 3:
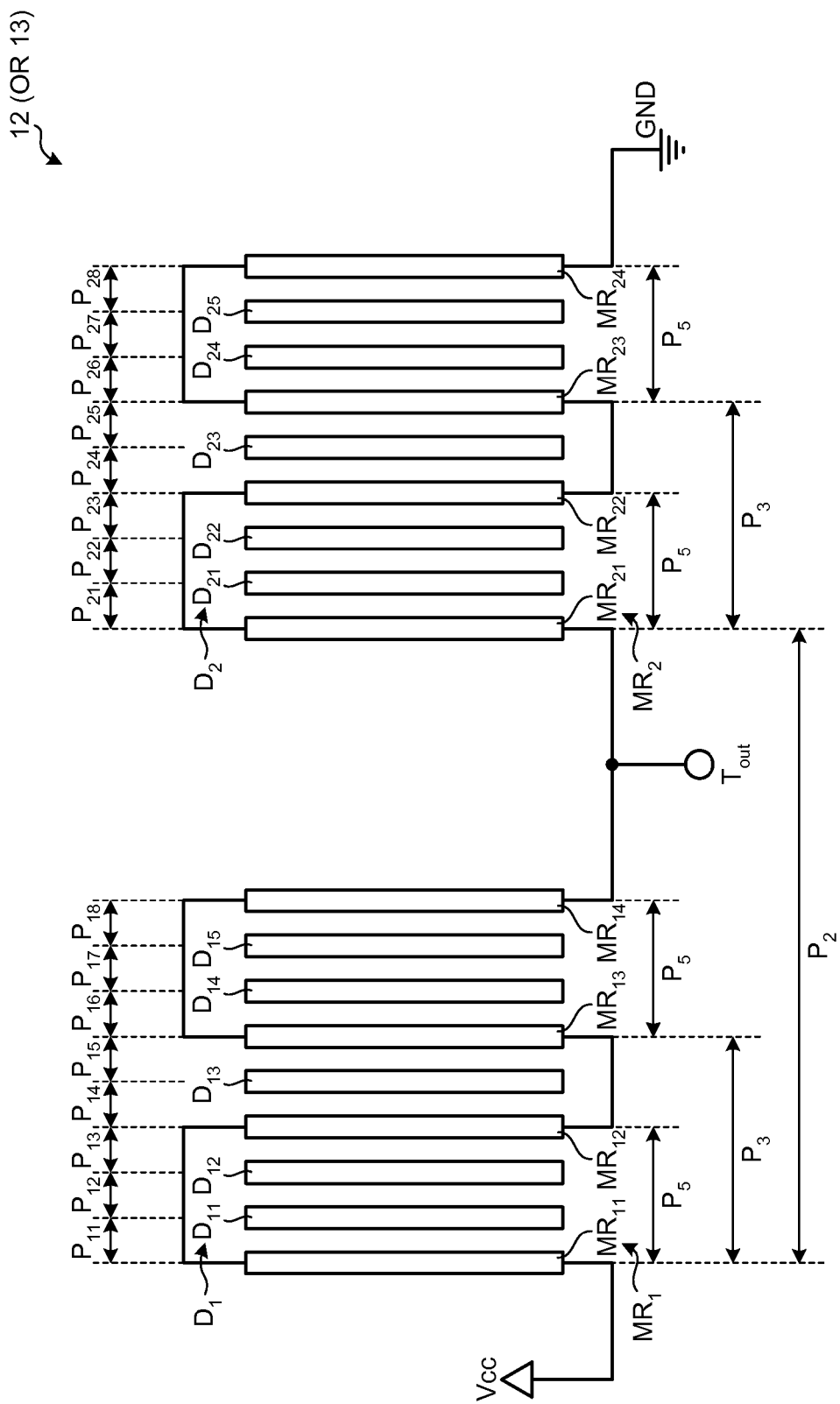
FIG. 3 depicts a configuration of a detection track according to the first embodiment.

A configuration of the common pattern to the phase-A detection track 12 and the phase-B detection track 13 is explained next with reference to FIG. 3. FIG. 3 depicts a configuration of the common pattern of the phase-A detection track 12 or the phase-B detection track 13.

As shown in FIG. 3, the common pattern includes a detection element group (a first detection element group) MR1, a detection element group (a second detection element group) MR2, a dummy element group D1, and a dummy element group D2.

The detection element group MR1 is arranged between a power supply potential (first reference potential) Vcc and an output terminal Tout. For example, one end of the detection element group MR1 is connected to the power supply potential Vcc and the other end thereof is connected to the output terminal Tout and one end of the second detection element group MR2. The detection element group MR1 includes a plurality of magnetic resistance elements (a plurality of first magnetic resistance elements) MR11 to MR14. Each of the magnetic resistance elements MR11 to MR14 extends in a form of a stripe in a direction substantially perpendicular to the circumferential direction of the rotary drum 1. Each of the magnetic resistance elements MR11 to MR14 is formed by a material mainly containing a ferromagnetic substance that has an AMR (Anisotropic Magnetic Resistance) effect. Each of the magnetic resistance elements MR11 to MR14 has a magnetism collection effect. Each of the magnetic resistance elements MR11 to MR14 is formed by Permalloy, for example.

In the detection element group MR1, if an order of cancelling target harmonic components (harmonic distortions) among a plurality of harmonic components superimposed on a fundamental component (a sine wave or a cosine wave) of the detection signal for the multi-pole magnetic pattern 3 is assumed as n, the magnetic resistance elements MR11 to MR14 are arranged at a pitch λ/(2n). This arrangement rule is hereinafter referred to as "first waveform-distortion cancellation rule", because the rule is for cancelling a waveform distortion of the detection signal for the multi-pole magnetic pattern 3. That is, the detection element group MR1 detects the change in the magnetic field received from the multi-pole magnetic pattern 3 by converting the change in the magnetic field into changes in resistances of the magnetic resistance elements MR11 to MR14 arranged according to the first waveform-distortion cancellation rule, and outputs a signal (a voltage) in proportion to a combination of the changes in the resistances of the magnetic resistance elements MR11 to MR14 to the output terminal Tout as a detection result.

For example, in a case of cancelling third and fifth harmonic distortions, the detection element group MR1 includes the magnetic resistance elements MR11 to MR14 arranged according to the first waveform-distortion cancellation rule that includes a positional relation (a pitch $P_5$) for cancelling the fifth distortion and a position relation (a pitch $P_3$) for cancelling the third distortion. The magnetic resistance element MR12 is arranged at a distance of $P_5 = \lambda/(2\times5) = \lambda/10$ from the magnetic resistance element MR11 with reference to the magnetic resistance element MR11. The magnetic resistance element MR13 is arranged at a distance of $P_3 = \lambda/(2\times3) = \lambda/6$ from the magnetic resistance element MR11. The magnetic resistance element MR14 is arranged at a distance of $P_3 + P_5 = \lambda/6 + \lambda/10$ from the magnetic resistance element MR11.

For example, there is assumed a case where the magnetic resistance element MR11 in the phase-A detection track 12 outputs a signal $F1(\theta)$ containing the third harmonic distortion. In this case, the signal $F1(\theta)$ is represented by the following Equation (2).

$$F1(\theta) = \sin\theta + \alpha_1 \sin 3\theta \quad \text{Equation 2}$$

At this time, a signal $F2(\theta)$ output from the magnetic resistance element MR13 arranged at the distance of λ/6 from the magnetic resistance element MR11, that is, at a position at an electric angle of 60 degrees is represented by the following Equation (3).

$$F2(\theta) = \sin)(\theta + 60°) + \alpha_2 \sin 3)(\theta + 60°) \quad \text{Equation 3}$$

A signal in proportion to a combination of changes in resistances of the magnetic resistance elements MR11 and MR13 can be approximately regarded as $F1(\theta) + F2(\theta)$, and therefore represented by the following Equation (4).

$$\begin{aligned} F1(\theta) + F2(\theta) &= \sin\theta + \alpha_1 \sin 3\theta + \sin(\theta + 60°) + \\ &\quad \alpha_2 \sin(3\theta + 180°) \\ &= \sin\theta + \alpha_1 \sin 3\theta + \sin(\theta + 60°) - \alpha_2 \sin 3\theta \\ &= \sin\theta + \sin(\theta + 60°) + (\alpha_1 - \alpha_2)\sin 3\theta \end{aligned} \quad \text{Equation 4}$$

At this time, $$\text{If } \alpha_1 = \alpha_2 \quad \text{Equation 5,}$$

$$F1(\theta) + F2(\theta) = \sin\theta + \sin(\theta + 60°) \quad \text{Equation 6.}$$

Thus, the third harmonic distortion is cancelled.

The detection element group MR2 is arranged between a ground potential (second reference potential) GND and the output terminal Tout. For example, one end of the detection element group MR2 is connected to the ground potential GND and the other end thereof is connected to the output terminal Tout and the other end of the first detection element group MR1. The detection element group MR2 includes a plurality of magnetic resistance elements (a plurality of second magnetic resistance elements) MR21 to MR24. Each of the magnetic resistance elements MR21 to MR24 extends in a form of a stripe in a direction substantially perpendicular to the circumferential direction of the rotary drum 1. Each of the magnetic resistance elements MR21 to MR24 is formed by a material mainly containing a ferromagnetic substance that has the AMR effect. Each of the magnetic resistance elements MR21 to MR24 has the magnetism collection effect. Each of the magnetic resistance elements MR21 to MR24 is formed by Permalloy, for example.

In the detection element group MR2, if the order of cancelling target harmonic components (harmonic distortions) among a plurality of harmonic components superimposed on the fundamental component (a sine wave or a cosine wave) of the detection signal for the multi-pole magnetic pattern 3 is assumed as n, the magnetic resistance elements MR21 to MR24 are arranged at a pitch $\lambda/(2n)$. That is, the detection element group MR2 detects the change in the magnetic field received from the multi-pole magnetic pattern 3 by converting the change in the magnetic field into changes in resistances of the magnetic resistance elements arranged according to the first waveform-distortion cancellation rule, and outputs a signal (a voltage) in proportion to a combination of the changes in the resistances of the magnetic resistance elements to the output terminal Tout as a detection result.

For example, in a case of cancelling the third and fifth harmonic distortions, the detection element group MR2 includes the magnetic resistance elements MR21 to MR24 arranged according to the first waveform-distortion cancellation rule that includes the positional relation (the pitch $P_5$) for cancelling the fifth distortion and the position relation (the pitch $P_3$) for cancelling the third distortion. The magnetic resistance element MR22 is arranged at a distance of $P_5=\lambda/(2\times 5)=\lambda/10$ from the magnetic resistance element MR21 with reference to the magnetic resistance element MR21. The magnetic resistance element MR23 is arranged at a distance of $P_3=\lambda/(2\times 3)=\lambda/6$ from the magnetic resistance element MR21. The magnetic resistance element MR24 is arranged at a distance of $P_3+P_5=\lambda/6+\lambda/10$ from the magnetic resistance element MR21.

Furthermore, if the order of the cancelling target harmonic components (harmonic distortions) among the harmonic components superimposed on the fundamental component (a sine wave or a cosine wave) of the detection signal for the multi-pole magnetic pattern 3 is assumed as p, each of the magnetic resistance elements M21 to M24 in the detection element group MR2 is arranged at a pitch $\lambda/p$ with respect to the corresponding magnetic resistance elements in the detection element group MR1. This arrangement rule is hereinafter referred to as "second waveform-distortion cancellation rule", because this rule differs from the above-described rule for cancelling the waveform distortion of the detection signal for the multi-pole magnetic pattern 3. That is, the signals output to the output terminal Tout from the corresponding magnetic resistance elements in the detection elements groups MR1 and MR2 cancel each other so as to cancel a $p^{th}$ harmonic distortion.

For example, if a second harmonic component is to be cancelled, the corresponding magnetic resistance elements in the detection element groups MR1 and MR2 are arranged according to the second waveform-distortion cancellation rule that includes a positional relation (a pitch $P_2$) for cancelling the second distortion. The magnetic resistance element MR21 is arranged at a distance of $P_2=\lambda/2$ from the magnetic resistance element MR11 with reference to the side of the magnetic resistance element MR11. The magnetic resistance element MR22 is arranged at the distance of $P_2=\lambda/2$ from the magnetic resistance element MR12. The magnetic resistance element MR23 is arranged at the distance of $P_2=\lambda/2$ from the magnetic resistance element MR13. The magnetic resistance element MR24 is arranged at the distance of $P_2=\lambda/2$ from the magnetic resistance element MR14.

For example, there is assumed a case where the magnetic resistance element MR11 in the phase-A detection track 12 outputs a signal $F3(\theta)$ containing the second harmonic distortion. In this case, the signal $F3(\theta)$ is represented by the following Equation (7).

$$F3(\theta)=\sin\theta+\beta_1 \sin 2\theta \qquad \text{Equation 7}$$

At this time, a signal $F4(\theta)$ output from the magnetic resistance element MR21 arranged at the distance of $\lambda/2$ from the magnetic resistance element MR11, that is, at a position at an electric angle of 180 degrees is represented by the following Equation (8).)

$$F4(\theta)=\sin(\theta+180°)+\beta_2 \sin 2)(\theta+180°) \qquad \text{Equation 8}$$

A signal obtained by causing the signals from the magnetic resistance elements MR11 and MR21 to cancel each other can be approximately regarded as $F3(\theta)-F4(\theta)$, and therefore represented by the following Equation (9).

$$\begin{aligned} F3(\theta) - F4(\theta) &= \sin\theta + \beta_1\sin 2\theta - \sin(\theta + 180°) - \\ &\quad \beta_2\sin(\theta + 360°) \\ &= \sin\theta + \beta_1\sin 2\theta + \sin\theta - \beta_2\sin 2\theta \\ &= \sin\theta + (\beta_1 - \beta_2)\sin 2\theta. \end{aligned} \qquad \text{Equation 9}$$

At this time, $$\text{If } \beta_1=\beta_2 \qquad \text{Equation 10,}$$

$$F3(\theta)-F4(\theta)=2\sin\theta \qquad \text{Equation 11.}$$

Thus, the second harmonic distortion is cancelled.

The dummy element group D1 includes a plurality of dummy magnetic resistance elements (a plurality of first dummy magnetic resistance elements) D11 to D15. Each of the dummy magnetic resistance elements D11 to D15 is similar in shape and dimensions to the magnetic resistance elements MR11 to MR14, and extends in a form of a stripe in the direction substantially perpendicular to the circumferential direction of the rotary drum 1. Each of the dummy magnetic resistance elements D11 to D15 is formed by a material mainly containing a ferromagnetic substance that has the AMR effect. Each of the dummy magnetic resistance elements D11 to D15 has the magnetism collection effect. Each of the dummy magnetic resistance elements D11 to D15 is formed by Permalloy, for example.

The dummy magnetic resistance elements D11 to D15 are arranged among the magnetic resistance elements MR11 to MR14. The dummy magnetic resistance elements D11 to D15 are arranged among the magnetic resistance elements MR11 to MR14 so that pitches P11 to P18 between adjacent magnetic resistance elements among the magnetic resistance elements MR11 to MR14 and the dummy magnetic resistance elements D11 to D15 are equivalent to one another.

Specifically, if $L^{th}$, $N^{th}$, and $M^{th}$ harmonic distortions are cancelled according to the first waveform-distortion cancellation rule and a least common multiple of L, M, and N is assumed as K, the dummy magnetic resistance elements are arranged so that pitches between the adjacent magnetic resistance elements are $\lambda/(mK)$ (m is an integer equal to or larger than 2).

For example, in a case of cancelling the third and fifth harmonic distortions according to the first waveform-distortion cancellation rule, the dummy magnetic resistance elements D11 to D15 are arranged so that the pitches P11 to P18 between the adjacent magnetic resistance elements are substantially $\lambda/30$.

That is, the dummy magnetic resistance element D11 is arranged at a position between the magnetic resistance elements MR11 and MR12 at a distance of $\lambda/30$ from the magnetic resistance element MR11. The dummy magnetic resistance element D12 is arranged at a position between the magnetic resistance elements MR11 and MR12 at a distance of $\lambda/30$ from the magnetic resistance element MR12. The dummy magnetic resistance element D13 is arranged at a position between the magnetic resistance elements MR12 and MR13 at a distance of $\lambda/30$ from both of the magnetic resistance elements MR12 and MR13. The dummy magnetic resistance element D14 is arranged at a position between the magnetic resistance elements MR13 and MR14 at a distance of $\lambda/30$ from the magnetic resistance element MR13. The dummy magnetic resistance element D15 is arranged at a position between the magnetic resistance elements MR13 and MR14 at a distance of $\lambda/30$ from the magnetic resistance element MR14.

The dummy element group D2 includes a plurality of dummy magnetic resistance elements (a plurality of second dummy magnetic resistance elements) D21 to D25. Each of the dummy magnetic resistance elements D21 to D25 is similar in shape and dimensions to the magnetic resistance elements MR21 to MR24, and extends in a form of a stripe in the direction substantially perpendicular to the circumferential direction of the rotary drum 1. Each of the dummy magnetic resistance elements D21 to D25 is formed by a material mainly containing a ferromagnetic substance that has the AMR effect. Each of the dummy magnetic resistance elements D21 to D25 has the magnetism collection effect. Each of the dummy magnetic resistance elements D21 to D25 is formed by Permalloy, for example.

The dummy magnetic resistance elements D21 to D25 are arranged among the magnetic resistance elements MR21 to MR24. The dummy magnetic resistance elements D21 to D25 are arranged among the magnetic resistance elements MR21 to MR24 so that pitches P21 to P28 between the adjacent magnetic resistance elements among the magnetic resistance elements MR21 to MR24 and the dummy magnetic resistance elements D21 to D25 are equivalent to one another.

Specifically, if $L^{th}$, $N^{th}$, and $M^{th}$ harmonic distortions cancelled according to the first waveform-distortion cancellation rule and the least common multiple of L, M, and N is assumed as K, the dummy magnetic resistance elements are arranged so that pitches between the adjacent magnetic resistance elements are $\lambda/(mK)$ (m is an integer equal to or larger than 2).

For example, in a case of cancelling the third and fifth harmonic distortions according to the first waveform-distortion cancellation rule, the dummy magnetic resistance elements D21 to D25 are arranged so that the pitches P21 to P28 between the adjacent magnetic resistance elements are substantially $\lambda/30$.

That is, the dummy magnetic resistance element D21 is arranged at a position between the magnetic resistance elements MR21 and MR22 at a distance of $\lambda/30$ from the magnetic resistance element MR21. The dummy magnetic resistance element D22 is arranged at a position between the magnetic resistance elements MR21 and MR22 at a distance of $\lambda/30$ from the magnetic resistance element MR22. The dummy magnetic resistance element D23 is arranged at a position between the magnetic resistance elements MR22 and MR23 at a distance of $\lambda/30$ from both of the magnetic resistance elements MR22 and MR23. The dummy magnetic resistance element D24 is arranged at a position between the magnetic resistance elements MR23 and MR24 at a distance of $\lambda/30$ from the magnetic resistance element MR23. The dummy magnetic resistance element D25 is arranged at a position between the magnetic resistance elements MR23 and MR24 at a distance of $\lambda/30$ from the magnetic resistance element MR24.

Each of the dummy magnetic resistance elements D601 to D615 shown in FIG. 2 is similar in shape and dimensions to the magnetic resistance elements MR11 to MR24, and extends in a form of a stripe in the direction substantially perpendicular to the circumferential direction of the rotary drum 1. Each of the dummy magnetic resistance elements D601 to D615 is formed by a material mainly containing a ferromagnetic substance that has the AMR effect, and has the magnetism collection effect. Each of the dummy magnetic resistance elements D601 to D605 is formed by Permalloy, for example.

The dummy magnetic resistance elements D601 to D615 are arranged at an equivalent pitch to the pitches P11 to P18, respectively. For example, if the pitches P11 to P18 are $\lambda/30$, then the 15 dummy magnetic resistance elements D601 to D615 are arranged, and a distance from the dummy magnetic resistance element D601 to the magnetic resistance element MR11 is $\lambda/30 \times 15 = \lambda/4$.

Each of the dummy magnetic resistance elements D701 to D715 shown in FIG. 2 is similar in shape and dimensions to the magnetic resistance elements MR11 to MR24, and extends in a form of a stripe in the direction substantially perpendicular to the circumferential direction of the rotary drum 1. Each of the dummy magnetic resistance elements D701 to D715 is formed by a material mainly containing a ferromagnetic substance that has the AMR effect, and has the magnetism collection effect. Each of the dummy magnetic resistance elements D701 to D715 is formed by Permalloy, for example.

The dummy magnetic resistance elements D701 to D715 are arranged at an equivalent pitch to the pitches P21 to P28, respectively. For example, if the pitches P21 to P28 are $\lambda/30$, then the 15 dummy magnetic resistance elements D701 to D715 are arranged, and a distance from the dummy magnetic resistance element D715 to the magnetic resistance element MR24 is $\lambda/30 \times 15 = \lambda/4$.

Figure 4:
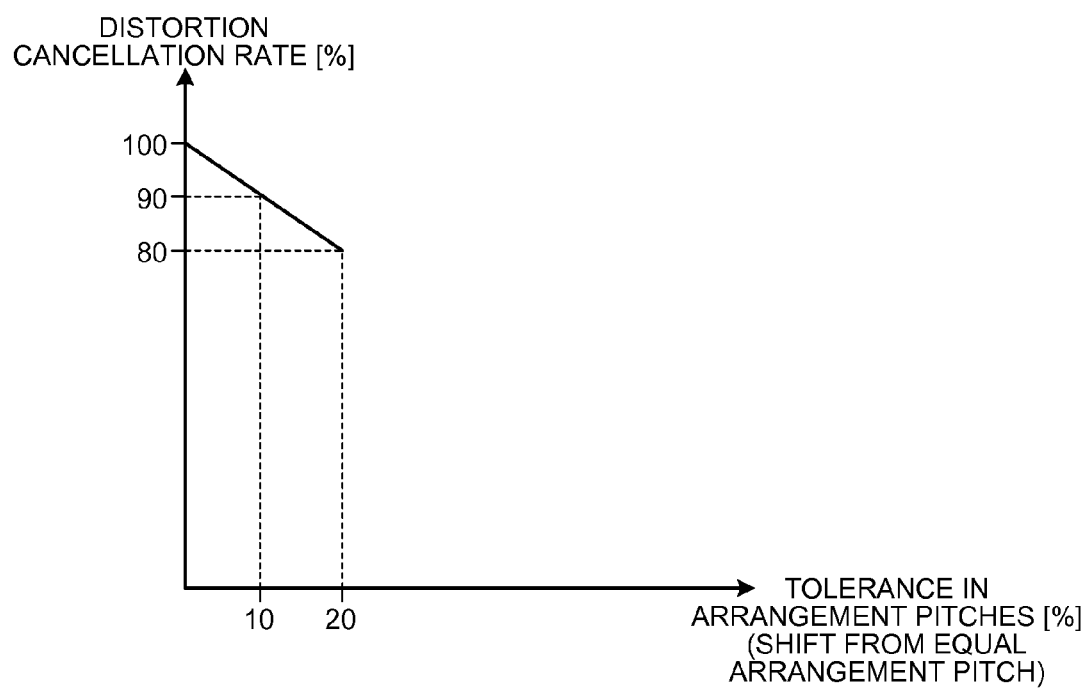
FIG. 4 depicts an effect of the first embodiment.

A result of a simulation conducted by the present inventors so as to validate the effects according to the first embodiment is explained next with reference to FIG. 4. FIG. 4 depicts a simulation result regarding a relation between a tolerance in arrangement pitches of the magnetic resistance elements and a distortion cancellation rate.

A horizontal axis of FIG. 4 indicates the tolerance in the arrangement pitches of the magnetic resistance elements. This tolerance represents a rate in the percentage calculated by dividing a shift amount from an equivalent arrangement pitch ($\lambda/30$ mentioned above, for example) that is an average pitch between the adjacent magnetic resistance elements among the magnetic resistance elements MR11 to MR14 and the dummy magnetic resistance elements D11 to D15 on the side of the detection element group MR1 by the equivalent arrangement pitch ($\lambda/30$ mentioned above, for example). A vertical axis of FIG. 4 indicates a cancellation rate of waveform distortions (a distortion cancelation rate) of the detection signal from a rotation-angle detection device 30. This distortion cancellation rate represents a rate in the percentage calculated by dividing the level of the cancelled waveform distortions by that of the waveform distortions before being cancelled.

As shown in FIG. 4, if the adjacent magnetic resistance elements among the magnetic resistance elements MR11 to MR14 and the dummy magnetic resistance elements D11 to D15 on the side of the detection element group MR1 are arranged at the equivalent pitch within the tolerance of ±10%, the distortion cancellation rate of 90% or higher that is accuracy practically required for the rotation-angle detection device 30 can be achieved. If the average pitch between the adjacent magnetic resistance elements deviates from within the tolerance of ±10%, the distortion cancellation rate is lower than 90%, which makes it difficult to ensure the accuracy practically required for the rotation-angle detection device 30.

Although not shown, a simulation result similar to that shown in FIG. 4 is obtained for the detection element group MR2 including the common pattern to a phase-A detection track 12 and a phase-B detection track 13.

Figure 9:
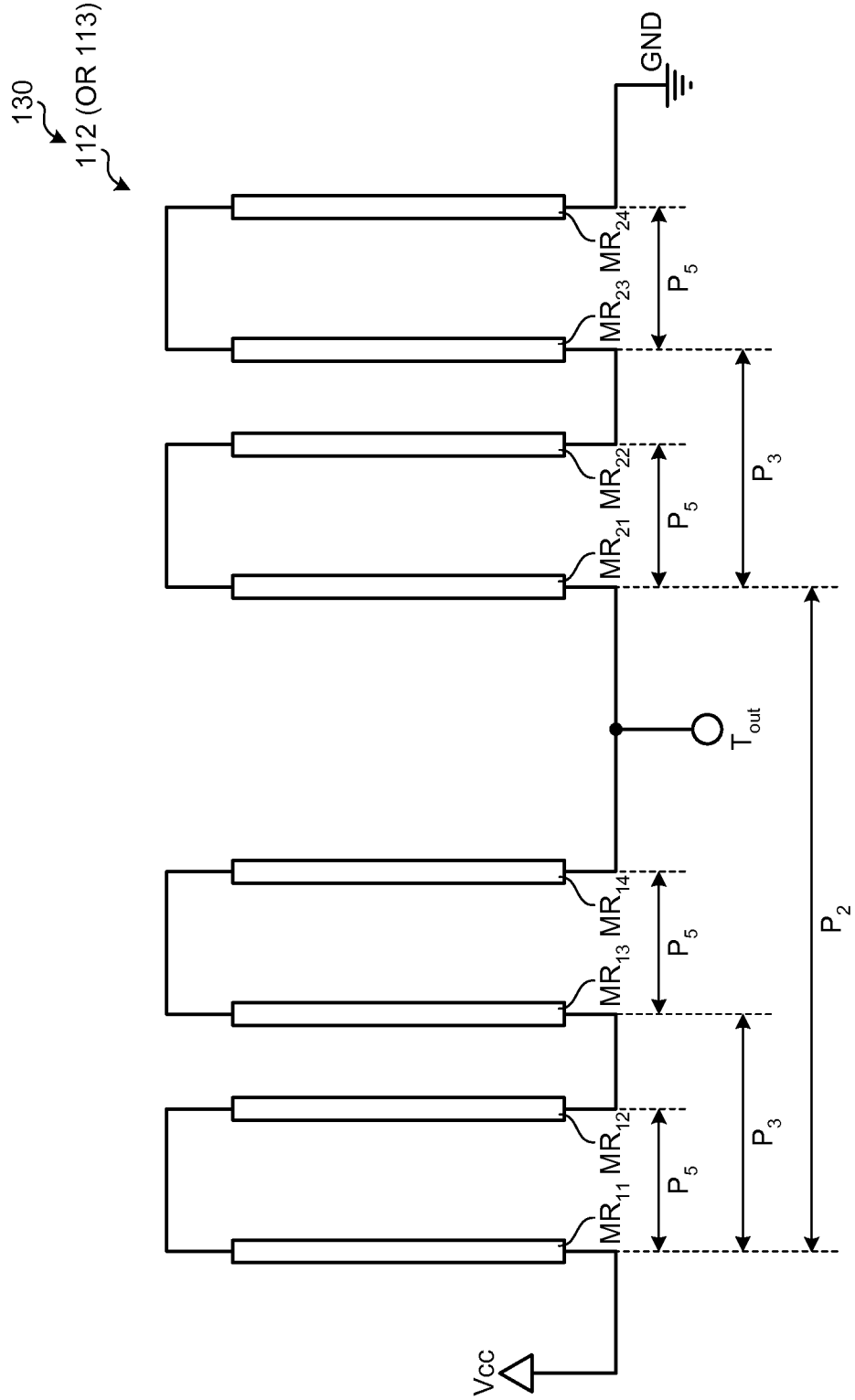
FIG. 9 depicts a configuration of a detection track according to the comparative example.

There is assumed a case where a common pattern to the phase-A detection track 112 and the phase-B detection track 113 does not include the dummy element groups D1 and D2 in the rotation-angle detection device 130 as shown in FIG. 9. In this case, on the side of the detection element group MR1, a pitch $P_3$-$P_5$ (=$\lambda$/15) between the magnetic resistance elements MR12 and MR13 is smaller than a pitch $P_5$ (=$\lambda$/10) between the magnetic resistance elements MR11 and MR12, and arrangement pitches of the magnetic resistance elements are not eqivalent. Accordingly, irregularities in the magnetism collection effects of the magnetic resistance elements MR11 to MR14 generate spatial distortions of magnetic flux densities. As a result, imbalance tends to occur between signals from the paired magnetic resistance elements arrayed in the positional relation for the cancellation of the fifth distortion, and imbalance tends to occur between signals from the paired magnetic resistance elements arrayed in the positional relation for the cancellation of the third distortion. For example, the Equation (5) mentioned above is not satisfied but as follows.

$$\alpha_1 \neq \alpha_2 \qquad \text{Equation 12}$$

This makes a third distortion term (($\alpha_1$−$\alpha_2$)sin 3θ) remain, so that the third harmonic distortion is not cancelled but remains in the signal in proportion to the combination of the changes in the resistances of the magnetic resistance elements MR11 and MR13.

Similarly, on the side of the detection element group MR2, the pitch (P3-P5) between the magnetic resistance elements MR22 and MR23 is smaller than the pitch P5 between the magnetic resistance elements MR21 and MR22, and arrangement pitches of the magnetic resistance elements are not eqivalent. Accordingly, irregular magnetism collection effects of the magnetic resistance elements MR21 to MR24 generate spatial distortions of a magnetic flux density. As a result, imbalance tends to occur between signals from the paired magnetic resistance elements arrayed in the positional relation for the cancellation of the fifth distortion, and imbalance tends to occur between signals from the paired magnetic resistance elements arrayed in the positional relation for the cancellation of the third distortion.

As a result, the efficiency for cancelling the waveform distortions of the detection signal from the rotation-angle detection device 130 possibly degrades.

On the other hand, in the first embodiment, the common pattern to the phase-A detection track 12 and the phase-B detection track 13 includes the dummy element groups D1 and D2. The dummy magnetic resistance elements D11 to D15 in the dummy element group D1 are arranged among the magnetic resistance elements MR11 to MR14. The pitches P11 to P18 between the adjacent magnetic resistance elements among the magnetic resistance elements MR11 to MR14 and the dummy magnetic resistance elements D11 to D15 are eqivalent to one another. On the side of the detection element group MR1, it is thereby possible to make eqivalent the magnetism collection effects of the magnetic resistance elements MR11 to MR14 and the dummy magnetic resistance element D11 to D15, and to make uniform a spatial distribution of magnetic flux densities near the magnetic resistance elements MR11 to MR14. Therefore, it is possible to reduce the imbalance between the signals from the paired magnetic resistance elements arrayed in the positional relation for the cancellation of, for example, the fifth distortion, and to reduce the imbalance between signals from the paired magnetic resistance elements arrayed in the positional relation for the cancellation of, for example, the third distortion.

Similarly, the dummy magnetic resistance elements D21 to D25 in the dummy element group D2 are arranged among the magnetic resistance elements MR21 to MR24. The pitches P21 to P28 between the adjacent magnetic resistance elements among the magnetic resistance elements MR21 to MR24 and the dummy magnetic resistance elements D21 to D25 are equivalent to one another. On the side of the detection element group MR2, it is thereby possible to make equivalent the magnetism collection effects of the magnetic resistance elements MR21 to MR24 and the dummy magnetic resistance element D21 to D25, and to make uniform a spatial distribution of magnetic flux densities near the magnetic resistance elements MR21 to MR24. Therefore, it is possible to reduce the imbalance between the signals from the paired magnetic resistance elements arrayed in the positional relation for the cancellation of, for example, the fifth distortion, and to reduce the imbalance between signals from the paired magnetic resistance elements arrayed in the positional relation for the cancellation of, for example, the third distortion.

As a result, it is possible to improve the efficiency for cancelling the waveform distortions of the detection signal from the rotation-angle detection device 30.

Particularly, the pitches between the adjacent magnetic resistance elements among the magnetic resistance elements MR11 to MR14 and the dummy magnetic resistance elements D11 to D15 are equivalent to one another within the tolerance of ±10%. The pitches between the adjacent magnetic resistance elements among the magnetic resistance elements MR21 to MR24 and the dummy magnetic resistance elements D21 to D25 are equivalent to one another within the tolerance of ±10%. It is thereby possible to achieve the efficiency for cancelling waveform distortions practically required for the rotation-angle detection device 30.

In the first embodiment, the magnetic resistance elements MR11 to MR14 and MR21 to MR24 generate heat by themselves by carrying a current therethrough. In this case, similarly to the above, the magnetic resistance elements MR11 to MR14, the dummy magnetic resistance elements D11 to D15, the magnetic resistance elements MR21 to MR24, and the dummy magnetic resistance elements D21 to D25 are formed by a material mainly containing a ferromagnetic substance, and the substrate 11 is formed by a material mainly containing glass. That is, the dummy magnetic resistance elements D11 to D15 and D21 to D25 formed by a material higher in heat conductivity than the substrate 11 can radiate the heat generated by the magnetic resistance elements MR11 to MR14 and MR21 to MR24. This can suppress element degradation resulting from self-heating of the magnetic resistance elements MR11 to MR14 and MR21 to MR24.

Figure 8:
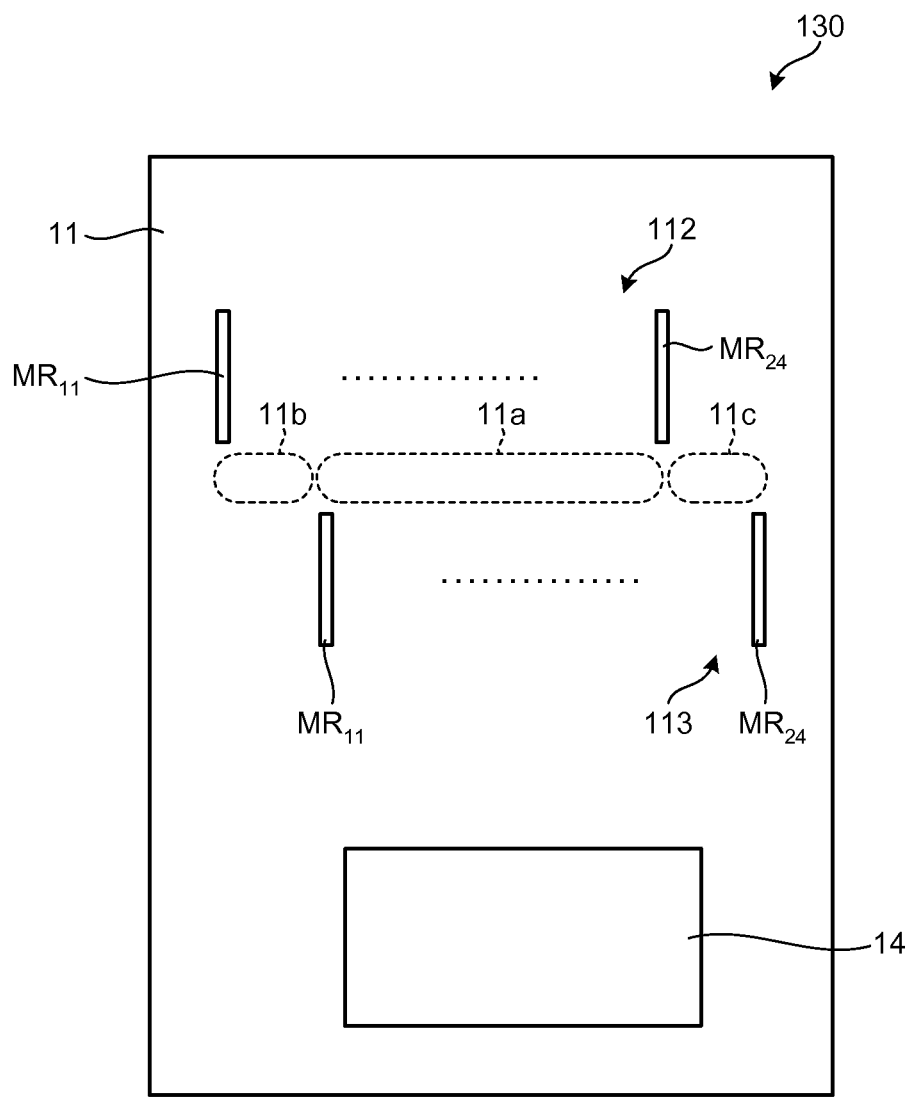
FIG. 8 depicts a configuration of a magnetic sensor according to a comparative example.

Alternatively, there is assumed a case where the phase-A detection track 112 and the phase-B detection track 113 differ in width and position in the circumferential direction of the rotary drum 1 in the rotation-angle detection device 130 as shown in FIG. 8. In this case, the spatial distortions of magnetic flux densities occur between a distribution of magnetic flux densities corresponding to a region 11$a$ in which the phase-A detection track 112 and the phase-B detection track 113 on the substrate 11 face to each other and a distribution of magnetic flux densities corresponding to regions 11$b$ and 11$c$ in which the phase-A detection track 112 and the phase-B detection track B on the substrate 11 do not face to each other. Accordingly, imbalance tends to occur between signals from the paired magnetic resistance elements (corresponding magnetic resistance elements in the detection element groups MR1 and MR2) arrayed in the positional relation for the cancellation of, for example, the second distortion.

On the other hand, in the first embodiment, the phase-A detection track 12 and the phase-B detection track 13 are equivalent in width and position in the circumferential direction of the rotary drum 1. That is, the dummy magnetic resistance elements D701 to D715 are arranged at the right of the common pattern in the phase-A detection track 12 in FIG. 2. The dummy magnetic resistance elements D601 to D615 are arranged at the left of the common pattern in the phase-B detection track 13 in FIG. 2. This makes the phase-A detection track 12 and the phase-B detection track 13 equivalent in width and the position in the circumferential direction of the rotary drum 1. Accordingly, this can make equivalent the distributions of magnetic flux densities corresponding to the regions between the phase-A detection track 12 and the phase-B detection track 13 on the substrate 11, and can make uniform the spatial distribution of magnetic flux densities between the phase-A detection track 12 and the phase-B detection track 13 on the substrate 11. Therefore, it is possible to reduce the imbalance between the signals from the paired magnetic resistance elements arrayed in the positional relation for the cancellation of, for example, the second distortion.

It should be noted that the substrate 11 can be formed by a material mainly containing zirconia or silicon in place of a material mainly containing glass. Furthermore, the common pattern to the phase-A detection track 12 and the phase-B detection track 13 can be configured to repeatedly array the configuration shown in FIG. 3 laterally.

Furthermore, an arrangement configuration of the detection element groups MR1 and MR2 within the common pattern to the phase-A detection track 12 and the phase-B detection track 13 is not limited to the configuration so as to cancel the third and fifth harmonic distortions according to the first waveform-distortion cancellation rule (a rule for cancelling distortions by the sum of signals) and to cancel the second harmonic distortion according to the second waveform-distortion cancellation rule (a rule for cancelling distortions by the difference among signals) as shown in FIG. 3. For example, a configuration so as to cancel the second and fifth harmonic distortions according to the first waveform-distortion cancellation rule and to cancel the third harmonic distortion according to the second waveform-distortion cancellation rule can be used as the arrangement configuration of the detection element groups MR1 and MR2. Alternatively, a configuration so as to cancel the second and third harmonic distortions according to the first waveform-distortion cancellation rule and to cancel the fifth harmonic distortion according to the second waveform-distortion cancellation rule can be used as the arrangement configuration of the detection element groups MR1 and MR2.

Second Embodiment

A rotation-angle detection device 30$i$ according to a second embodiment is explained next. In the following descriptions, features different from the first embodiment are mainly explained.

Figure 5:
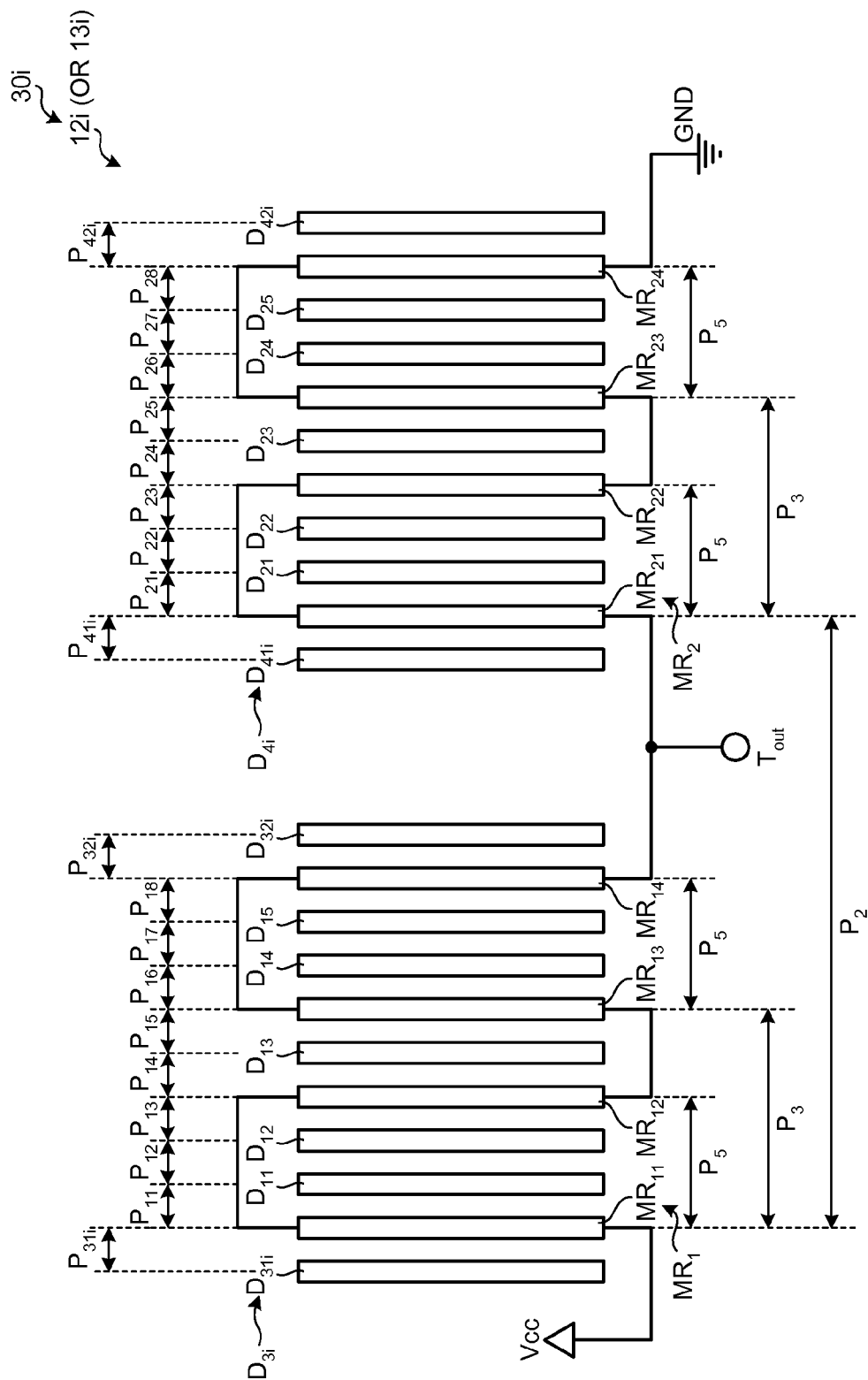
FIG. 5 depicts a configuration of a detection track according to a second embodiment.

The rotation-angle detection device 30$i$ differs from the rotation-angle detection device 30 according to the first embodiment in an internal configuration of a common pattern to a phase-A detection track 12$i$ and a phase-B detection track 13$i$. That is, as shown in FIG. 5, the common pattern further includes dummy element groups D3$i$ and D4$i$. FIG. 5 depicts an internal configuration of the common pattern to the phase-A detection track 12$i$ and the phase-B detection track 13$i$.

The dummy element group D3$i$ is arranged on both outsides of the detection element group MR1. The dummy element group D3$i$ includes a plurality of dummy magnetic resistance elements (a plurality of third dummy magnetic resistance elements) D31$i$ and D32$i$. Each of the dummy magnetic resistance elements D31$i$ and D32$i$ is similar in shape and dimensions to the magnetic resistance elements MR11 to MR14, and extends in a form of a stripe in the direction substantially perpendicular to the circumferential direction of the rotary drum 1. Each of the dummy magnetic resistance elements D31$i$ and D32$i$ is formed by a material mainly containing a ferromagnetic substance that has the AMR effect, and has the magnetism collection effect. Each of the dummy magnetic resistance elements D31$i$ and D32$i$ is formed by Permalloy, for example.

The dummy magnetic resistance elements D31$i$ and D32$i$ are arranged on both outsides of the detection element group MR1 so that pitches P11 to P18, P31$i$, and P32$i$ between adjacent magnetic resistance elements among the magnetic resistance elements MR11 to MR14, the dummy magnetic resistance elements D11 to D15, and the dummy magnetic resistance elements D31$i$ and D32$i$ are equivalent to one another.

For example, the dummy magnetic resistance element D31$i$ is arranged at a position opposite to the dummy magnetic resistance element D11 across the magnetic resistance element MR11 at a distance of P31$i$ ($\lambda/30$, for example) from the magnetic resistance element MR11. The dummy magnetic resistance element D32$i$ is arranged at a position opposite to the dummy magnetic resistance element D15 across the magnetic resistance element MR14 at a distance of P32$i$ ($\lambda/30$, for example) from the magnetic resistance element MR14.

The dummy element group D4$i$ is arranged on both outsides of the detection element group MR2. The dummy element group D4$i$ includes a plurality of dummy magnetic resistance elements (a plurality of third dummy magnetic resistance elements) D41$i$ and D42$i$. Each of the dummy magnetic resistance elements D41$i$ and D42$i$ is similar in shape and dimensions to the magnetic resistance elements MR21 to MR24, and extends in a form of a stripe in the direction substantially perpendicular to the circumferential direction of the rotary drum 1. Each of the dummy magnetic resistance elements D41$i$ and D42$i$ is formed by a material mainly containing a ferromagnetic substance that has the AMR effect, and has the magnetism collection effect. Each of the dummy magnetic resistance elements D41$i$ and D42$i$ is formed by Permalloy, for example.

The dummy magnetic resistance elements D41$i$ and D42$i$ are arranged on both outsides of the detection element group MR2 so that pitches P21 to P28, P41$i$, and P42$i$ between the adjacent magnetic resistance elements among the magnetic resistance elements MR21 to MR24, the dummy magnetic resistance elements D21 to D25, and the dummy magnetic resistance elements D41*i* and D42*i* are equivalent to one another.

For example, the dummy magnetic resistance element D41*i* is arranged at a position opposite to the dummy magnetic resistance element D21 across the magnetic resistance element MR21 at a distance of P41*i* ($\lambda/30$, for example) from the magnetic resistance element MR21. The dummy magnetic resistance element D42*i* is arranged at a position opposite to the dummy magnetic resistance element D25 across the magnetic resistance element MR24 at a distance of P42*i* ($\lambda/30$, for example) from the magnetic resistance element MR24.

As described above, in the second embodiment, the pitches P11 to P18, P31*i*, and P32*i* between the adjacent magnetic resistance elements among the magnetic resistance elements MR11 to MR14, the dummy magnetic resistance elements D11 to D15, and the dummy magnetic resistance elements D31*i* and D32*i* are equivalent to one another on the side of the detection element group MR1. On the side of the detection element group MR1, it is thereby possible to make uniform the magnetism collection effects of the magnetic resistance elements MR11 to MR14, the dummy magnetic resistance elements D11 to D15, and the dummy magnetic resistance elements D31*i* and D32*i*, and to maintain the balance between the spatial distribution of magnetic flux densities near the magnetic resistance elements MR11 and MR14 on both ends and that near the other magnetic resistance elements MR12 and MR13.

Similarly, the pitches P21 to P28, P41*i*, and P42*i* between the adjacent magnetic resistance elements among the magnetic resistance elements MR21 to MR24, the dummy magnetic resistance elements D21 to D25, and the dummy magnetic resistance elements D41*i* and D42*i* are equivalent to one another on the side of the detection element group MR2. On the side of the detection element group MR2, it is thereby possible to make uniform the magnetism collection effects of the magnetic resistance elements MR21 to MR24, the dummy magnetic resistance elements D21 to D25, and the dummy magnetic resistance elements D41*i* and D42*i*, and to maintain the balance between the spatial distribution of magnetic flux densities near the magnetic resistance elements MR21 and MR24 on both ends and that near the other magnetic resistance elements MR22 and MR23.

As a result, it is possible to improve the efficiency for cancelling the waveform distortions of the detection signal from the rotation-angle detection device 30*i*.

Furthermore, the dummy magnetic resistance elements are arranged equivalently both on both outsides of the detection element group MR1 and on both outsides of the detection element group MR2. Therefore, it is possible to make uniform distributions of magnetic flux densities in regions corresponding to the both ends of the detection element group MR1 and those of the detection element group MR2. This can reduce the imbalance between the signals from the paired magnetic resistance elements (corresponding magnetic resistance elements in the detection element groups MR1 and MR2) arrayed in the positional relation for the cancellation of, for example, the second distortion.

It should be noted that the number of dummy magnetic resistance elements in the dummy element group D3*i* arrayed on both outsides of the detection element group MR1 can be set to be equivalent to or larger than two. The number of dummy magnetic resistance elements in the dummy element group D4*i* arrayed on both outsides of the detection element group MR2 can be set to be equivalent to or larger than two.

Furthermore, the rotation-angle detection device 30*i* can be configured so that one of the dummy element groups D3*i* and D4*i* is omitted.

Third Embodiment

A rotation-angle detection device 30*j* according to a third embodiment is explained next. In the following descriptions, features different from the first embodiment are mainly explained.

Figure 6:
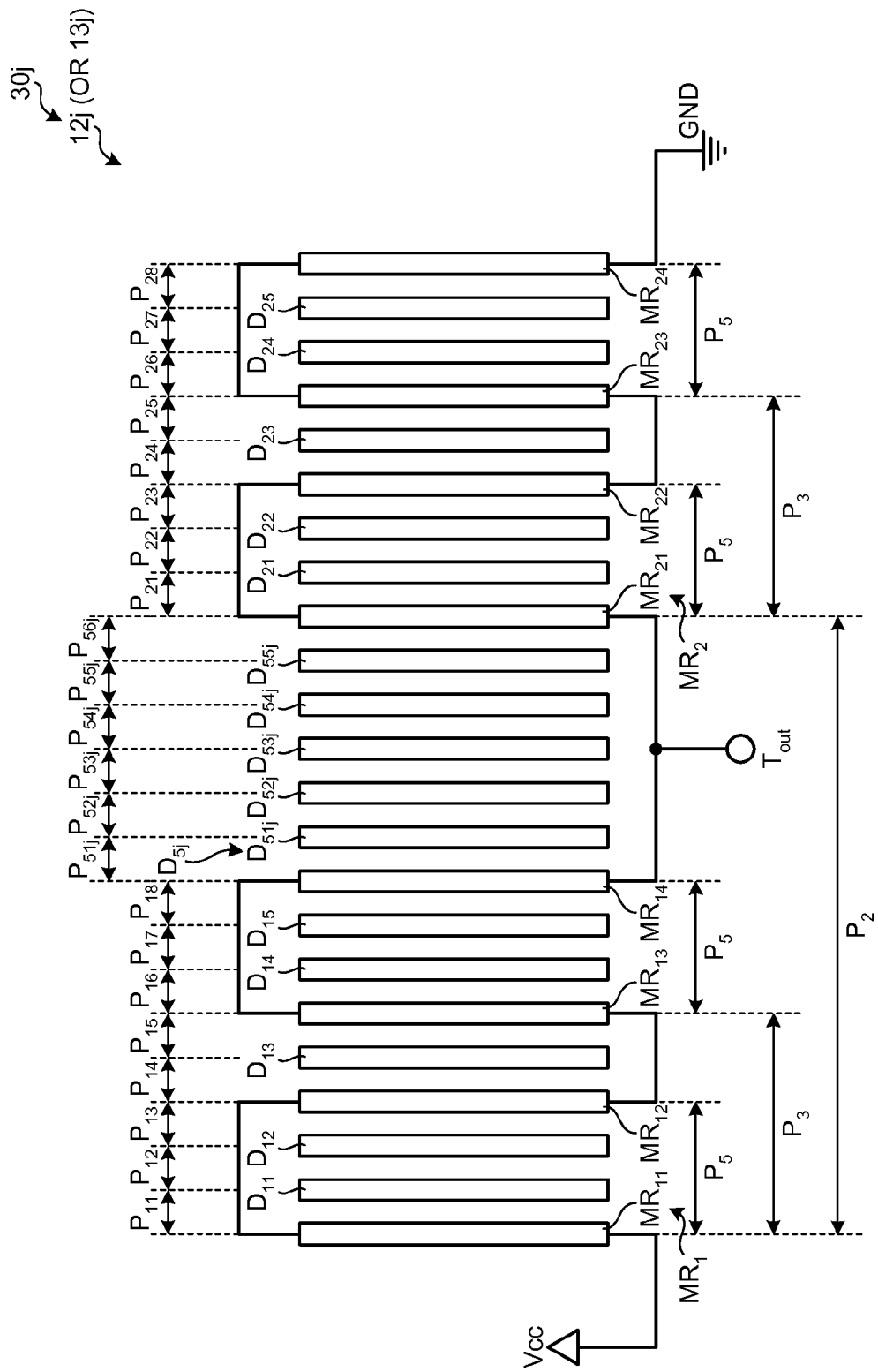
FIG. 6 depicts a configuration of a detection track according to a third embodiment.

The rotation-angle detection device 30*j* differs from the rotation-angle detection device 30 according to the first embodiment in an internal configuration of a common pattern to a phase-A detection track 12*j* and a phase-B detection track 13*j*. That is, as shown in FIG. 6, the common pattern further includes a dummy element group D5*j*. FIG. 6 depicts an internal configuration of the common pattern to the phase-A detection track 12*j* and the phase-B detection track 13*j*.

The dummy element group D5*j* is arranged between the detection element groups MR1 and MR2. The dummy element group D5*j* includes a plurality of dummy magnetic resistance elements (a plurality of fourth dummy magnetic resistance elements) D51*j* to D55*j*. Each of the dummy magnetic resistance elements D51*j* to D55*j* is similar in shape and dimensions to the magnetic resistance elements MR11 to MR14 and MR21 to MR24, and extends in a form of a stripe in the direction substantially perpendicular to the circumferential direction of the rotary drum 1. Each of the dummy magnetic resistance elements D51*j* to D55*j* is formed by a material mainly containing a ferromagnetic substance that has the AMR effect, and has the magnetism collection effect. Each of the dummy magnetic resistance elements D51*j* to D55*j* is formed by Permalloy, for example.

The dummy magnetic resistance elements D51*j* to D55*j* are arranged between the detection element groups MR1 and MR2 so that pitches P11 to P18, P51*j* to P56*j*, and P21 to P28 between adjacent magnetic resistance elements among the magnetic resistance elements MR11 to MR14, the dummy magnetic resistance elements D11 to D15, the magnetic resistance elements MR21 to MR24, and the dummy magnetic resistance elements D21 to D25 are equivalent to one another.

For example, the dummy magnetic resistance element D51*j* is arranged at a position between the magnetic resistance elements MR14 and MR21 at a distance of P51*j* ($\lambda/30$, for example) from the magnetic resistance element MR14. The dummy magnetic resistance element D52*j* is arranged at a position between the magnetic resistance elements MR14 and MR21 at a distance of P51*j*+P52*j* ($2\times\lambda/30$, for example) from the magnetic resistance element MR14. The dummy magnetic resistance element D53*j* is arranged at a position between the magnetic resistance elements MR14 and MR21 at a distance of P51*j*+P52*j*+P53*j* ($3\times\lambda/30$, for example) from the magnetic resistance element MR14. The dummy magnetic resistance element D54*j* is arranged at a position between the magnetic resistance elements MR14 and MR21 at a distance of P55*j*+P56*j* ($2\times\lambda/30$, for example) from the magnetic resistance element MR21. The dummy magnetic resistance element D55*j* is arranged at a position between the magnetic resistance elements MR14 and MR21 at a distance of P56*j* ($\lambda/30$, for example) from the magnetic resistance element MR21.

As described above, in the third embodiment, the pitches P11 to P18, P51*j* to P56J, and P21 to P28 between the adjacent magnetic resistance elements among the magnetic resistance elements MR11 to MR14, the dummy magnetic resistance elements D11 to D15, the magnetic resistance elements MR21 to MR24, the dummy magnetic resistance elements D21 to D25, and the dummy magnetic resistance elements D51$j$ to D55$j$ are equivalent to one another. It is thereby possible to make uniform the magnetism collection effects among the corresponding magnetic resistance elements in the detection element groups MR1 and MR2. Therefore, it is possible to reduce the imbalance between the signals from the paired magnetic resistance elements (corresponding magnetic resistance elements in the detection element groups MR1 and MR2) arrayed in the positional relation for the cancellation of, for example, the second distortion.

Fourth Embodiment

A rotation-angle detection device 30$k$ according to a fourth embodiment is explained next. In the following descriptions, features different from the first embodiment are mainly explained.

Figure 7:
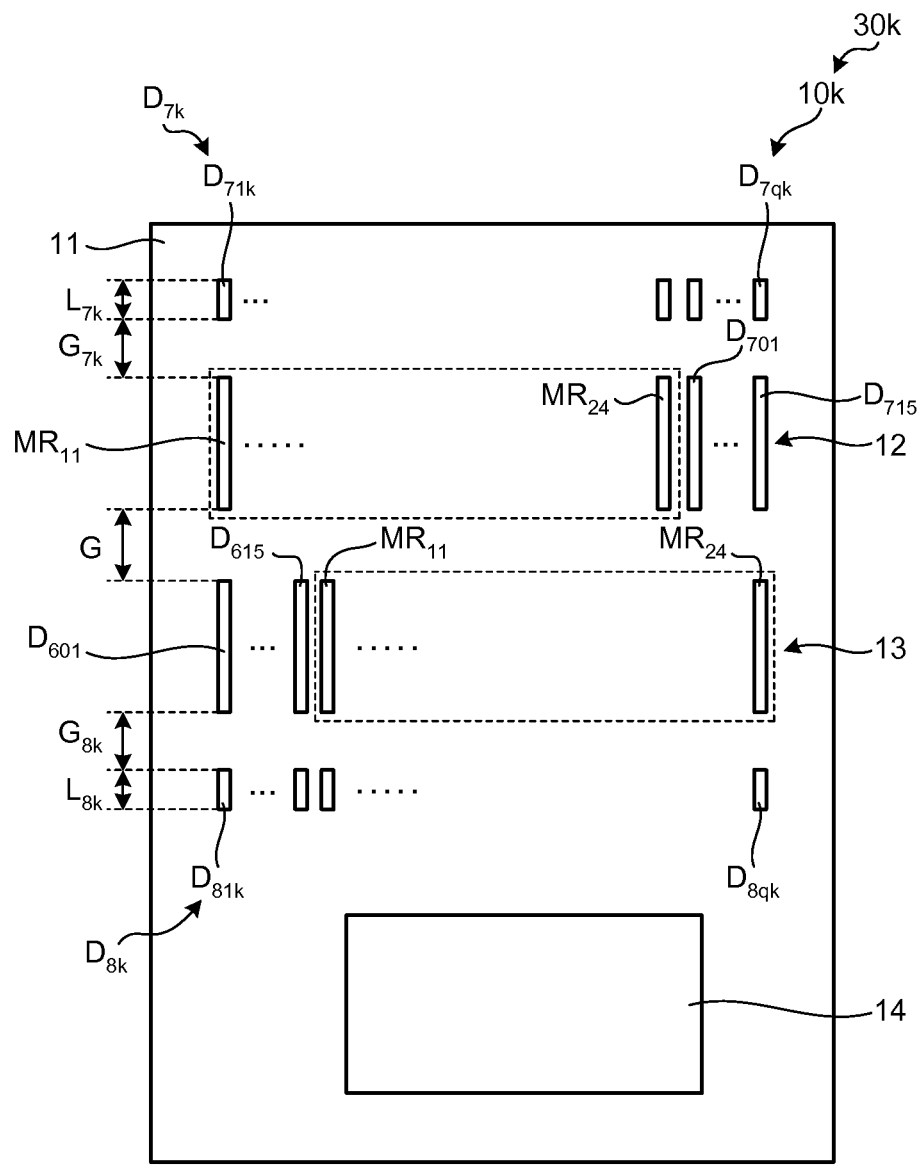
FIG. 7 depicts a configuration of a magnetic sensor according to a fourth embodiment.

The rotation-angle detection device 30$k$ differs from the rotation-angle detection device 30 according to the first embodiment in a configuration of a magnetic sensor 10$k$. That is, as shown in FIG. 7, the magnetic sensor 10$k$ further includes dummy element groups D7$k$ and D8$k$. FIG. 7 depicts a configuration of the magnetic sensor 10$k$.

The dummy element group D7$k$ or D8$k$ is arranged above or below the phase-A detection track 12 and the phase-B detection track 13. The dummy element group D7$k$ includes a plurality of dummy magnetic resistance elements (a plurality of fifth dummy magnetic resistance elements) D71$k$ to D7$qk$. The dummy magnetic resistance elements D8$k$ includes a plurality of dummy magnetic resistance elements (a plurality of fifth dummy magnetic resistance elements) D81$k$ to D8$qk$. Each of the dummy magnetic resistance elements D71$k$ to D7$qk$ or D81$k$ to D8$qk$ has a length L7$k$ or L8$k$ equivalent to or larger than the pitches P11 to P18 (see FIG. 3) and equivalent to or smaller than a length of each of the magnetic resistance elements MR11 to MR14, and extends in a form of a stripe in the direction substantially perpendicular to the circumferential direction of the rotary drum 1. Each of the dummy magnetic resistance elements D71$k$ to D7$qk$ and D81$k$ to D8$qk$ is formed by a material mainly containing a ferromagnetic substance that has the AMR effect, and has the magnetism collection effect. Each of the dummy magnetic resistance elements D71$k$ to D7$qk$ and D81$k$ to D8$qk$ is formed by Permalloy, for example.

The dummy magnetic resistance elements D71$k$ to D7$qk$ or D81$k$ to D8$qk$ are arranged at upper or lower positions corresponding to the magnetic resistance elements MR11 to MR14, the dummy magnetic resistance elements D11 to D15, and the dummy magnetic resistance elements D701 to D715 or the dummy magnetic resistance elements D601 to D605 at a gap G7$k$ or G8$k$. The gap G7$k$ or G8$k$ is equivalent to a gap G between the phase-A detection track 12 and the phase-B detection track 13. The upper gap G7$k$ is equivalent to the lower gap G8$k$.

As described above, in the fourth embodiment, the dummy magnetic resistance elements D71$k$ to D7$qk$ or D81$k$ to D8$qk$ are arranged at the upper or lower positions corresponding to the magnetic resistance elements MR11 to MR14, the dummy magnetic resistance elements D11 to D15, and the dummy magnetic resistance elements D701 to D715 or the dummy magnetic resistance elements D601 to D605 at the equivalent gap G7$k$ or G8$k$. On the side of the detection element group MR1 (see FIG. 3), it is thereby possible to make equivalent the magnetism collection effects of the magnetic resistance elements MR11 to MR14 and the dummy magnetic resistance elements D11 to D15 not only in a horizontal direction but also in a vertical direction, and to make further uniform the spatial distribution of magnetic flux densities near the magnetic resistance elements MR11 to MR14. Therefore, it is possible to further reduce the imbalance between the signals from the paired magnetic resistance elements arrayed in the positional relation for the cancellation of, for example, the fifth distortion, and to further reduce the imbalance between the signals from the paired magnetic resistance elements arrayed in the positional relation for the cancellation of, for example, the third distortion.

Similarly, on the side of the detection element group MR2 (see FIG. 3), it is thereby possible to make equivalent the magnetism collection effects of the magnetic resistance elements MR21 to MR24 and the dummy magnetic resistance elements D21 to D25 not only in the horizontal direction but also in the vertical direction, and to make further uniform the spatial distribution of magnetic flux densities near the magnetic resistance elements MR21 to MR24. Therefore, it is possible to further reduce the imbalance between the signals from the paired magnetic resistance elements arrayed in the positional relation for the cancellation of, for example, the fifth distortion, and to further reduce the imbalance between the signals from the paired magnetic resistance elements arrayed in the positional relation for the cancellation of, for example, the third distortion.

As a result, it is possible to improve the efficiency for cancelling the waveform distortions of the detection signal from the rotation-angle detection device 30$k$.

INDUSTRIAL APPLICABILITY

As described above, the rotation-angle detection device according to the present invention is useful for detecting a rotation angle of a motor and the like.

REFERENCE SIGNS LIST 1 rotary drum
3 multi-pole magnetic pattern
4 magnetic pattern
10 magnetic sensor
11 substrate
12, 12$i$, 12$j$ phase-A detection track
13, 13$i$, 13$j$ phase-B detection track
14 phase-Z detection track
20 rotation-angle computation unit
30, 30$i$, 30$j$, 30$k$ rotation-angle detection device
112 phase-A detection track
113 phase-B detection track
130 rotation-angle detection device
D1 dummy element group
D2 dummy element group
D3$i$ dummy element group
D4$i$ dummy element group
D5$j$ dummy element group
D7$k$ dummy element group
D8$k$ dummy element group
D11 to D15 dummy magnetic resistance element
D21 to D25 dummy magnetic resistance element
D31$i$, D32$i$ dummy magnetic resistance element
D41$i$, D42$i$ dummy magnetic resistance element
D51$j$ to D55$j$ dummy magnetic resistance element
D71$k$ to D7$qk$ dummy magnetic resistance element
D81$k$ to D8$qk$ dummy magnetic resistance element
D601 to D615 dummy magnetic resistance element
D701 to D715 dummy magnetic resistance element
MR1 detection element group
MR2 detection element group MR11 to MR14 magnetic resistance element
MR21 to MR24 magnetic resistance element

The invention claimed is:

1. A rotation-angle detection device for detecting a rotation angle of a rotary drum having a multi-pole magnetic pattern at a magnetization pitch $\lambda$ on an outer circumference, the rotation-angle detection device comprising:
a substrate arranged facing an outer circumference of the rotary drum;
a first detection track that is arranged on the substrate and detects the multi-pole magnetic pattern; and
a second detection track that is provided on the substrate in a form that the second detection track is lined with respect to the first detection track in a rotational axis direction of the rotary drum, and detects the multi-pole magnetic pattern in a phase different by $\lambda/4$ from a phase of the first detection track, wherein
the first and second detection tracks each include;
a first detection element group that includes a plurality of first magnetic resistance elements arranged between a first reference potential and an output terminal, wherein when k is an integer equivalent to or larger than 2 and orders of target harmonic components to be cancelled among a plurality of harmonic components superimposed on a fundamental component of a detection signal for the multi-pole magnetic pattern are assumed as n=$n_1, \ldots,$ and $n_k$, respectively, the first magnetic resistance elements are arranged at a pitch $\lambda/(2n)$ for each of the orders n=$n_1, \ldots,$ and $n_k$ of the target harmonic components,
a plurality of first dummy magnetic resistance elements arranged among the first magnetic resistance elements,
a second detection element group that includes a plurality of second magnetic resistance elements arranged at the pitch $\lambda/(2n)$ between the output terminal and a second reference potential,
a plurality of second dummy magnetic resistance elements arranged between the second magnetic resistance elements, and
a plurality of third dummy magnetic resistance elements arranged between the first detection element group and the second detection element group at an equivalent pitch,
and wherein, when m is assumed as an integer equivalent to or larger than 2 and a least common multiple of $n_1, \ldots,$ and $n_k$ is assumed as K, pitches between adjacent magnetic resistance elements among the first magnetic resistance elements and the first dummy magnetic resistance elements, and pitches between adjacent magnetic resistance elements among the second magnetic resistance elements and the second dummy magnetic resistance elements are $\lambda(mK)$,
when the order of a target harmonic component to be canceled is assumed as p, pitches between the first magnetic resistance elements and the second magnetic resistance elements corresponding to the first magnetic resistance elements are $\lambda/p$,
pitches between adjacent magnetic resistance elements among the first magnetic resistance elements, the first dummy magnetic resistance elements, the third dummy magnetic resistance elements, the second magnetic resistance elements, and the second dummy magnetic resistance elements are equivalent to one another, and
the first detection track and the second detection track each further include a plurality of fourth dummy magnetic resistance elements on one end side in an arrangement direction of the magnetic resistance elements on the substrate for the first detection track and the second detection track to be equivalent in width and position in a circumferential direction of the rotary drum.

2. The rotation-angle detection device according to claim 1, further comprising a plurality of fifth dummy magnetic resistance elements arranged on both sides in the rotational axis direction of the first detection track and the second detection track on the substrate at an equivalent pitch.

3. The rotation-angle detection device according to claim 1, wherein the pitches between adjacent magnetic resistance elements among the first magnetic resistance elements and the first dummy magnetic resistance elements are equivalent to one another within a tolerance of ±10%, and the pitches between adjacent magnetic resistance elements among the second magnetic resistance elements and the second dummy magnetic resistance elements are equivalent to one another within a tolerance of ±10%.

4. The rotation-angle detection device according to claim 1, wherein
each of the first magnetic resistance elements, the second magnetic resistance elements, the first dummy magnetic resistance elements, the second dummy resistance elements and the third dummy magnetic resistance elements is formed by a material mainly containing a ferromagnetic substance, and
the substrate is formed by a material mainly containing glass.

* * * * *